(12) United States Patent
Huang

(10) Patent No.: US 12,383,967 B2
(45) Date of Patent: Aug. 12, 2025

(54) TUBE CUTTER CAPABLE OF CUTTING TUBES WITH VARIOUS DIAMETERS

(71) Applicant: YUNG CHI INDUSTRY CO., LTD., Taichung (TW)

(72) Inventor: Wu Sheng Huang, Taichung (TW)

(73) Assignee: YUNG CHI INDUSTRY CO., LTD., Taichung (TW)

( * ) Notice: Subject to any disclaimer, the term of this patent is extended or adjusted under 35 U.S.C. 154(b) by 207 days.

(21) Appl. No.: 18/471,792

(22) Filed: Sep. 21, 2023

(65) Prior Publication Data
US 2024/0100611 A1 Mar. 28, 2024

(30) Foreign Application Priority Data

Sep. 23, 2022 (TW) ................... 111136081

(51) Int. Cl.
B23D 21/08 (2006.01)
(52) U.S. Cl.
CPC .................... B23D 21/08 (2013.01)
(58) Field of Classification Search
CPC ............................... B26D 21/06–12
USPC ...................................... 30/92–108
See application file for complete search history.

(56) References Cited

U.S. PATENT DOCUMENTS

| 2,875,518 | A | * | 3/1959 | Dyczynski | B23D 21/08 30/102 |
| 2,937,440 | A | * | 5/1960 | Kelly | B23D 21/08 30/95 |
| 2,988,814 | A | * | 6/1961 | Carpenter | B23D 21/08 30/102 |
| 3,163,932 | A | * | 1/1965 | Adams | B23D 21/08 30/101 |
| 3,335,492 | A | * | 8/1967 | Spiro | B23D 21/08 30/101 |
| 4,078,304 | A | * | 3/1978 | Netzel | B23D 21/08 30/95 |
| D263,111 | S | * | 2/1982 | Besenbruch | D8/60 |
| 4,769,911 | A | * | 9/1988 | Araki | B23D 21/04 30/95 |
| 4,831,732 | A | * | 5/1989 | Garton | B23D 21/08 30/101 |
| 5,285,576 | A | * | 2/1994 | Taylor | B23D 21/08 30/93 |
| 5,325,587 | A | * | 7/1994 | Steiner | H02G 1/1224 30/91.2 |

(Continued)

Primary Examiner — Adam J Eiseman
Assistant Examiner — Richard D Crosby, Jr.
(74) Attorney, Agent, or Firm — Sinorica International Patent & Trademark

(57) ABSTRACT

A tube cutter comprises a main body, a cutting member and a base. The main body has a cutting space and a mounting portion corresponded to the cutting space. The cutting member, which is received in the main body, has a at least a portion protruding into the cutting space. The base has a first clamping portion and a second clamping portion; wherein the base is received in the mounting portion of the main body and can be switched between a first angle and a second angle. The first clamping portion is communicated with the cutting space to clamp a tube with a first predetermined diameter when the base is switched to the first angle. The second clamping portion is communicated with the cutting space to clamp a tube with a second predetermined diameter when the base is switched to the second angle.

10 Claims, 6 Drawing Sheets

(56) References Cited

U.S. PATENT DOCUMENTS

| | | | | |
|---|---|---|---|---|
| 5,581,886 | A * | 12/1996 | Sesser | B23D 21/08 30/101 |
| 6,357,119 | B1 * | 3/2002 | Acerra | B08B 1/10 30/92 |
| RE40,461 | E * | 8/2008 | Hu | B23D 21/08 30/94 |
| 8,573,099 | B2 * | 11/2013 | Huang | B23D 21/08 82/113 |
| 10,052,701 | B2 * | 8/2018 | Zhou | B26D 7/2621 |
| 11,224,925 | B2 * | 1/2022 | Canis | B23D 21/06 |
| 11,684,984 | B2 * | 6/2023 | Frenken | B23D 21/00 30/92 |
| 11,701,720 | B2 * | 7/2023 | Huang | B23D 21/04 30/93 |
| D1,013,474 | S * | 2/2024 | Rampling | D8/60 |
| 2012/0023751 | A1 * | 2/2012 | Chiu | B23D 21/08 30/101 |
| 2012/0247286 | A1 * | 10/2012 | Huang | B23D 21/08 82/60 |
| 2014/0082850 | A1 * | 3/2014 | Stokes | B25F 1/003 81/319 |
| 2016/0008895 | A1 * | 1/2016 | Chen | B23D 21/08 30/102 |
| 2018/0021863 | A1 * | 1/2018 | Chen | B23D 21/08 30/102 |
| 2018/0297227 | A1 * | 10/2018 | Jenkins | B26D 3/169 |

\* cited by examiner

TUBE CUTTER CAPABLE OF CUTTING TUBES WITH VARIOUS DIAMETERS

BACKGROUND OF THE INVENTION

1. Technical Field

The present invention relates to a hand tool, and more particularly to a tube cutter capable of cutting tubes with various diameters.

2. Description of Related Art

In engineering operations, various types of tubes (such as copper pipes, iron pipes, PVC hoses, etc.) are often required. Typically, these tubes are manufactured in long lengths, but in practical applications, only a portion of them may be needed. In such cases, it is necessary to cut the tubes to the required length using tube cutting equipment.

A prior art taught a blade wheel at one end of a upper clamping part and a corresponding circular groove on one end of a lower clamping part to accommodate a tube. Operator can manipulate the tube cutter to bring the upper clamping part together or separate it from the lower clamping part, thereby adjusting a distance between the blade wheel and the circular groove to clamp the tube and carry out tube cutting operations.

The issue with the structure of the above-mentioned pipe cutter is that dimensions of the circular groove in the lower clamping part are fixed, making it suitable only for tubes of specific diameter. If an operator wishes to use the tube cutter to cut tubes that are larger or smaller than the corresponding diameter, it lead to instability in clamping due to the mismatch between the pipe diameter and the groove. This result in the tube shifting during the cutting operation, requiring more time and effort to adjust the pipe's position, leading to reduced cutting efficiency. Alternatively, it may necessitate the use of different tube cutters specifically designed for the pipe diameter, which is highly inconvenient.

BRIEF SUMMARY OF THE INVENTION

In view of the above, the primary objective of the present invention is to provide a tube cutter capable of cutting tubes with various diameters by using only one tube cutter to have a convenient tube cutting experience.

In order to achieve the objective of the present invention, A tube cutter, comprises a main body having a cutting space and a mounting portion corresponded to the cutting space; a cutting member received in the main body and having a least a portion protruding into the cutting space; and a base having a first clamping portion and a second clamping portion; wherein the base is received in the mounting portion of the main body to be switched between a first angle and a second angle; the first clamping portion is communicated with the cutting space to clamp a tube of a first predetermined diameter when the base is switched to the first angle, and the second clamping portion is communicated with the cutting space to clamp a tube of a second predetermined diameter when the base is switched to the second angle.

In an embodiment, the base is detachably connected to the main body to be switched between the first angle and the second angle by detaching the base from the main body.

In an embodiment, the mounting portion is provided with a groove, in which the base is received; the groove has a top opening and a side opening; the top opening is communicated with the cutting space, allowing the first clamping portion or the second clamping portion to communicate with the cutting space; the side opening isn't communicated with the cutting space, allowing the base for insertion into or removal from the groove.

In an embodiment, the mounting portion further comprises a blocking surface covering at least a portion of the top opening, so that a width of the top opening is smaller than that of the base.

In an embodiment, the base further comprises a first interface connected to the first clamping portion and a second interface connected to the second clamping portion; the first interface is engaged with the blocking surface when the base is switched to the first angle, and the second interface is engaged with the blocking surface when the base is switched to the second angle.

In an embodiment, the mounting portion has a first limiting portion and a second limiting portion; the base has a fixing portion; the fixing portion is engaged with the first limiting portion when the base is switched to the first angle, and the fixing portion is engaged with the second limiting portion when the base is switched to the second angle.

In an embodiment, the mounting portion has a groove; the first limiting portion and the second limiting portion are formed on sidewalls of the groove respectively, and the first limiting portion is higher than that of the second limiting portion.

In an embodiment, the base has an arm, on which the fixing portion is provided.

In an embodiment, the base has two arms on opposite sides thereof, each of the arms is provided with a fixing portion; the mounting portion of the main body has two first limiting portions and two second limiting portions; the fixing portions are engaged with one of the first limiting portions and one of the second limiting portions respectively when the base is switched to the first angle, and the fixing portions are engaged with the other first limiting portion and the other second limiting portion respectively when the base is switched to the second angle; each of the arms has a connecting end and a free end, the connecting ends of the arms are connected to the base, while the free ends of the arms extend in opposite directions.

In an embodiment, the first clamping portion and the second clamping portion are two slots formed on opposite sides of the base respectively.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
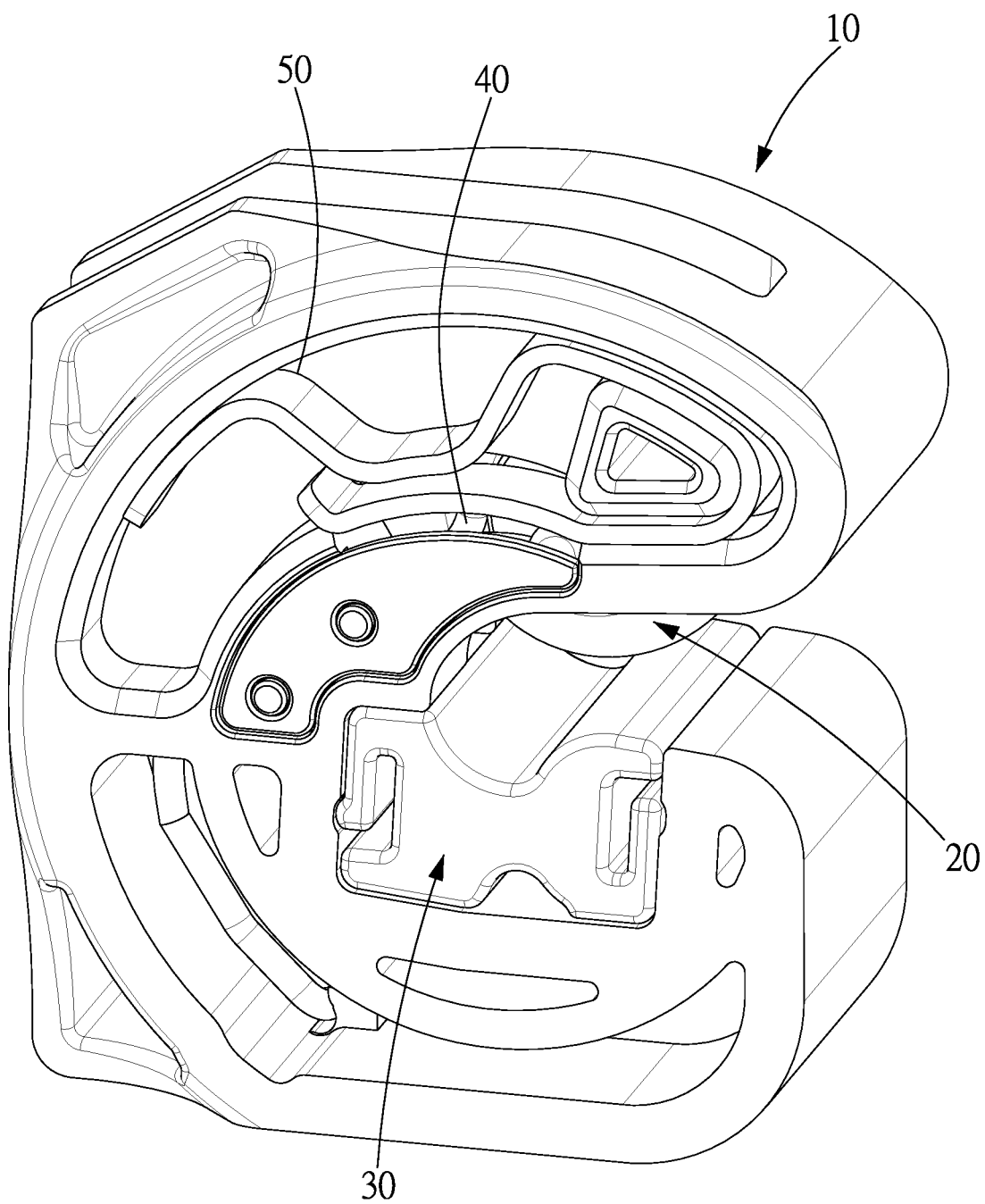
FIG. 1 is a perspective view of a preferred embodiment of the present invention.
Figure 2:
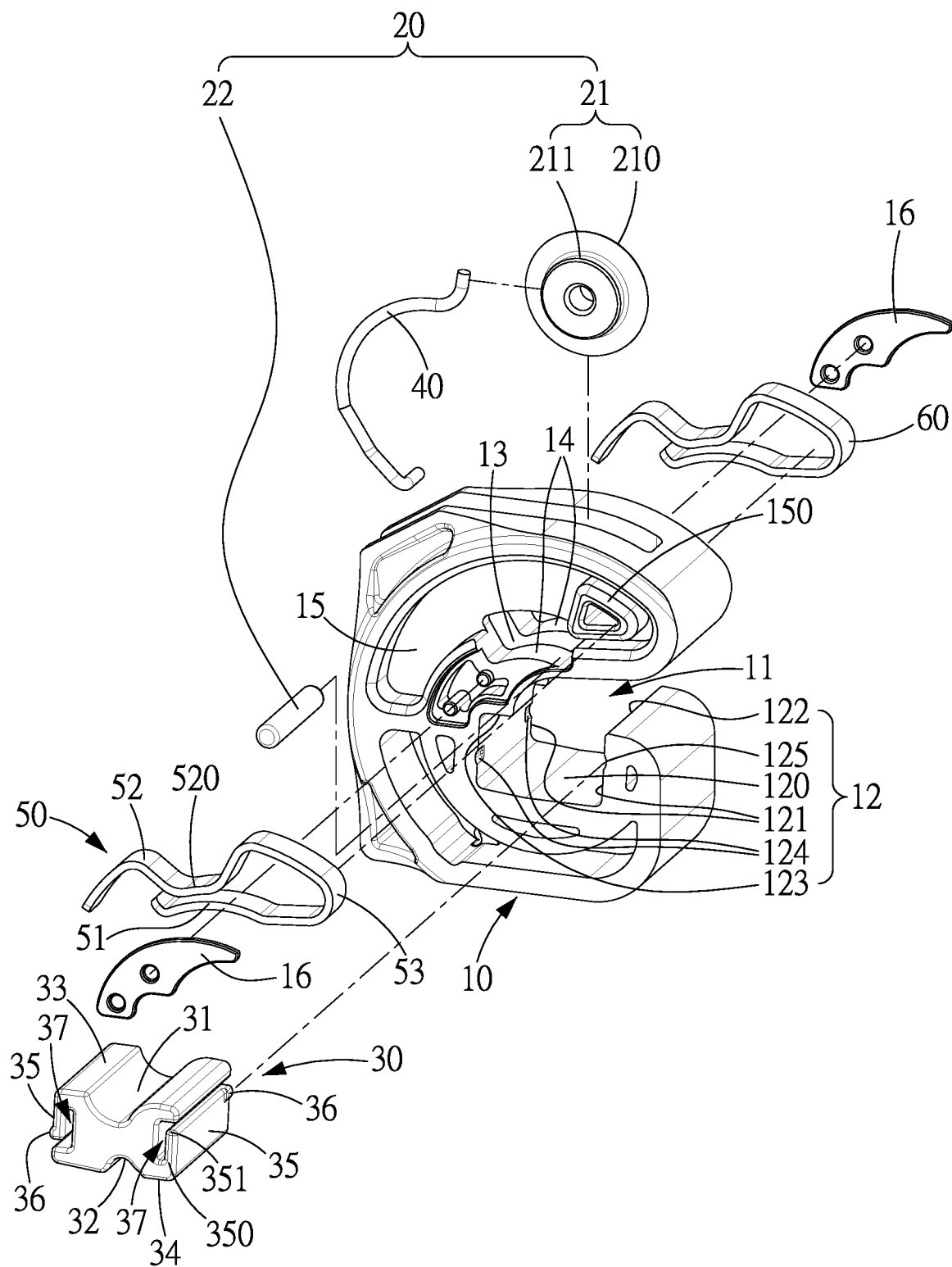
FIG. 2 is an exploded view of the preferred embodiment of the present invention.
Figure 3:
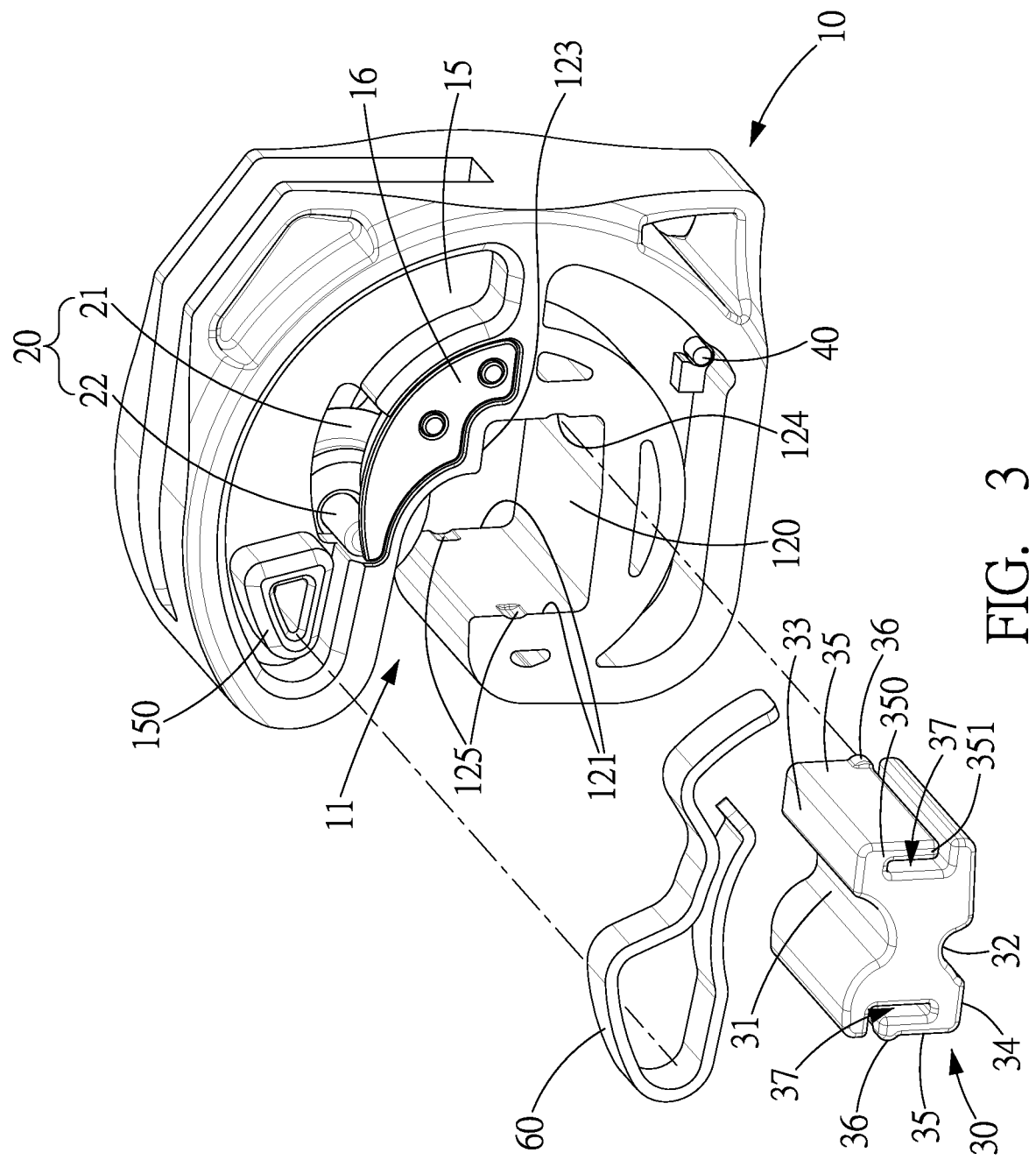
FIG. 3 is another exploded view of the preferred embodiment of the present invention.
Figure 4:
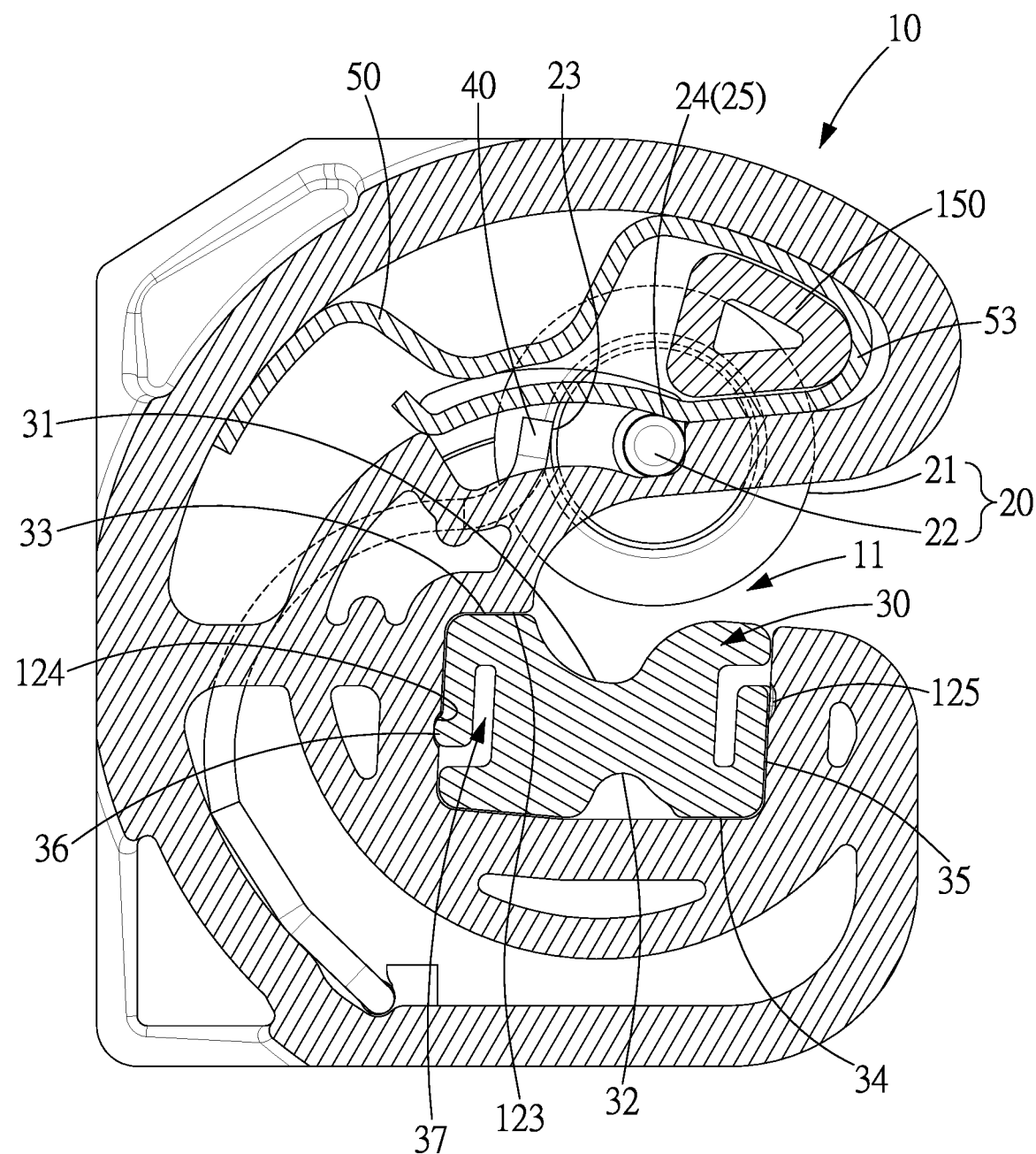
FIG. 4 is a sectional view of the preferred embodiment of the present invention, showing the first elastic member and the second elastic member engaging the cutting blade.

As shown in FIG. 1 to FIG. 4, a tube cutter of a preferred embodiment of the present invention includes a main body 10, a cutting member 20, a base 30, a first elastic member 40, a second elastic member 50 and a third elastic member 60.

The main body 10 is a C-shape circular case, having a cutting space 11 configured to receive a tube, and a mounting portion 12 located beneath the cutting space 11. In the present preferred embodiment, the mounting portion 12 has a groove 120, two side openings 121 and a top opening 122. The groove 120 is corresponded to the base 30 to receive the base 30. The side openings 121 are located on opposite sides of the main body 10, communicated with the groove 120 but not communicated with the cutting space 11, which allows the base 30 for insertion or removal from the groove 120. The top opening 122 is above the groove 120, so that the groove 120 is communicated with the cutting space 11 through the top opening 122. The mounting portion 12 further includes a blocking surface 123, which is above the groove 120 and covers at least a portion of the groove 120, making a width of the top opening 122 less than a width of the base 30, so that the top opening 122 doesn't allow the base 30 for insertion or removal of the groove 120. The mounting portion 12 further includes two first limiting members 124 and two second limiting members 125 received in opposite sidewalls of the groove 120 respectively. A height of each first limiting member 124 relative to a bottom of the groove 120 is lower than a height of each second limiting member 125. In an alternate preferred embodiment, the first limiting members and the second limiting members are located in the same sidewall of the groove. The main body 10 further has a rail 13 configured to receive at least a portion of the cutting member 20, and the rail 13 is located on a top of the cutting space 11. In the present preferred embodiment, the main body 10 has two slots 14 arranged side by side, and the rail 13 is formed on bottoms of the slots 14. The main body 10 further includes two curve slots 15 above the slots 14 and communicated with the slots 14 respectively. A pillar 150 is provided on a bottom of each curve slots 15. The curve slots 15 are configured to receive the second elastic member 50 and the third elastic member 60 respectively.

The cutting member 20 is received in the main body 10 with at least a portion protruding into the cutting space 11 to cut the tube in the cutting space 11. The cutting member 20 includes a cutting blade 21 and a shaft 22. The cutting blade 21 has a circular blade portion 210 and a circular protruding portion 211, the protruding portion 211 extends outwardly along an axial direction of the blade portion 210, and an outer diameter of the blade portion 210 is greater than that of the protruding portion 211. The shaft 22 passes through the center of the cutting blade 21, allowing the cutting blade 21 to rotate relative to the shaft 22. Opposite ends of the shaft 22 are engaged with the rail 13, and the cutting member 20 is movable in the rail 13. The main body 10 further includes two covers 16 detachably connected to the opposite ends of the shaft 22, limiting the shaft 22 from moving along its axial direction. The cutting member 20 further includes a first preload portion 23, a second preload portion 24 and a third preload portion 25. The first preload portion 23, the second preload portion 24 and the third preload portion 25 are predetermined portions of a surface of the cutting member 20, on which the first elastic member 40, the second elastic member 50 and the third elastic member 60 rest respectively. In the present preferred embodiment, the first preload portion 23 is provided on the outer periphery of the protruding portion 211 of the cutting blade 21, the second preload portion 24 and the third preload portion 25 is provided on the shaft 22 and located on opposite sides of the cutting blade 21 respectively. In an alternative preferred embodiment, the first preload portion, the second preload portion and the third preload portion are located on either the cutting blade or the shaft.

The base 30 is received in the mounting portion 12 of the main body 10, and is able to be switched between a first angle and a second angle. The base 30 has a first clamping portion 31 and a second clamping portion 32 located on opposite ends of the base respectively. In the present embodiment, the first clamping portion 31 and the second clamping portion 32 are two grooves. A width and a depth of the first clamping portion 31 are larger than that of the second clamping portion 32, so that the base 30 is able to receive tubes in different diameters. In an alternative preferred embodiment, the first clamping portion and the second clamping portion are two roller devices with different sizes.

The base 30 further includes a first interface 33 and a second interface 34. The first interface 33 is connected to the first clamping portion 31, and the second interface 34 is connected to the second clamping portion 32. When the base 30 is received in the main body 10 in the first angle, the first interface 33 is engaged with the blocking surface 123. When the base 30 is received in the main body 10 in the second angle, the second interface 34 is engaged with the blocking surface 123.

The base 30 further includes two arms 35 and two fixing portions 36. The arms 35 are connected to left and right ends of the base 30 and adjacent to the sidewalls of the groove 120 respectively. The base 30 has two moving space 37, the arms 35 are located in the moving spaces 37 respectively to move relative to the moving space 37. In particular, each arm 35 has a connecting end 350 and a free end 351. The connecting ends 350 of the arms 35 are connected to the base 30 while the free ends 351 of the arms 35 extend in opposite directions. The fixing portions 36 are mounted on the free ends 351 respectively and extend in opposite directions. Heights of the fixing portions 36 are different, allowing them to correspond to the first limiting portions 124 and the second limiting portions 125. When the base 30 is received in the main body 10 in the first angle, the fixing portions 36 engage one of the first limiting portions 124 and one of the second limiting portions 125 respectively. When the base 30 is received in the main body 10 in the second angle, the fixing portions 36 engage the other first limiting portion 124 and the other second limiting portion 125 respectively. In the present preferred embodiment, the first limiting portions 124 and the second limiting portions 125 are slots, and the fixing portions 36 are ribs corresponded to the slots. In an alternative preferred embodiment, the first limiting portions and the second limiting portions are ribs and the fixing portions are slots.

The first elastic member 40 is a curved spring, with an end fixed to the main body 10 and an opposite end engaged with the first preload portion 23 of the cutting member 20, providing a first elastic force (also known as first preload) biasing the cutting member 20 to move toward a front end of the rail 13.

The second elastic member 50 is received in one of the curve slots 15, having a first elastic piece 51, a second elastic piece 52 and a combining portion 53. The first elastic piece 51 and the second elastic piece 52 are kept away from each other in a predetermined distance. The combining portion 53 is an annular structure formed between the first elastic piece 51 and the second elastic piece 52 with opposite ends connected to the first elastic piece 51 and the second elastic piece 52. When the second elastic member 50 is received in the curve slot 15, the first elastic piece 51 engages the second preload portion 24 of the cutting member 20, while the second elastic piece 52 engages a sidewall of the curve slot 15, and the pillar 150 of the curve slot 15 is surrounded by the combining portion 53 to fix the second elastic member 50 in the curve slot 15. The second elastic piece 52 further includes a curve section 520 bending toward the first elastic piece 51. The second elastic member 52 is engaged with the second preload portion 24 of the cutting member 20, providing a second elastic force (also known as second preload) on the second preload portion 24. Wherein, directions of the first elastic force and the second elastic force are different. In particular, a direction of the first elastic force is substantially parallel to a first normal direction which is defined as a direction perpendicular to a surface of the first preload portion 23. The second elastic force is substantially parallel to a second normal direction which is defined as a direction perpendicular to a surface of the second preload portion 24. A non-zero angle is formed between the first normal direction and the second normal direction, so that the first normal direction and the second normal direction are non-parallel. In the present preferred embodiment, the second elastic force, provided by the second elastic member 52, biasing the shaft 22 of the cutting member 20 to rest against the rail 13.

The third elastic member 60 has the same structure as the second elastic member 50, so I do not describe again. The third elastic member 60 is received in the curve slot 15 relative to the second elastic member 50, with an end engaged with the third preload portion 25 of the cutting member 20, providing a third elastic force (also known as third preload) on the third preload portion 25. The direction of the third elastic force is substantially parallel to a third normal direction which is defined as a direction perpendicular to the surface of the third preload portion 25. The third normal direction is substantially parallel to the second normal direction, so that the third elastic member 60 and the second elastic member 50 exert balanced elastic forces in the same direction on both sides of the cutter member 20. In an alternative preferred embodiment, it is possible that only the first elastic member and the second elastic member are installed without the third elastic member.

Figure 5:
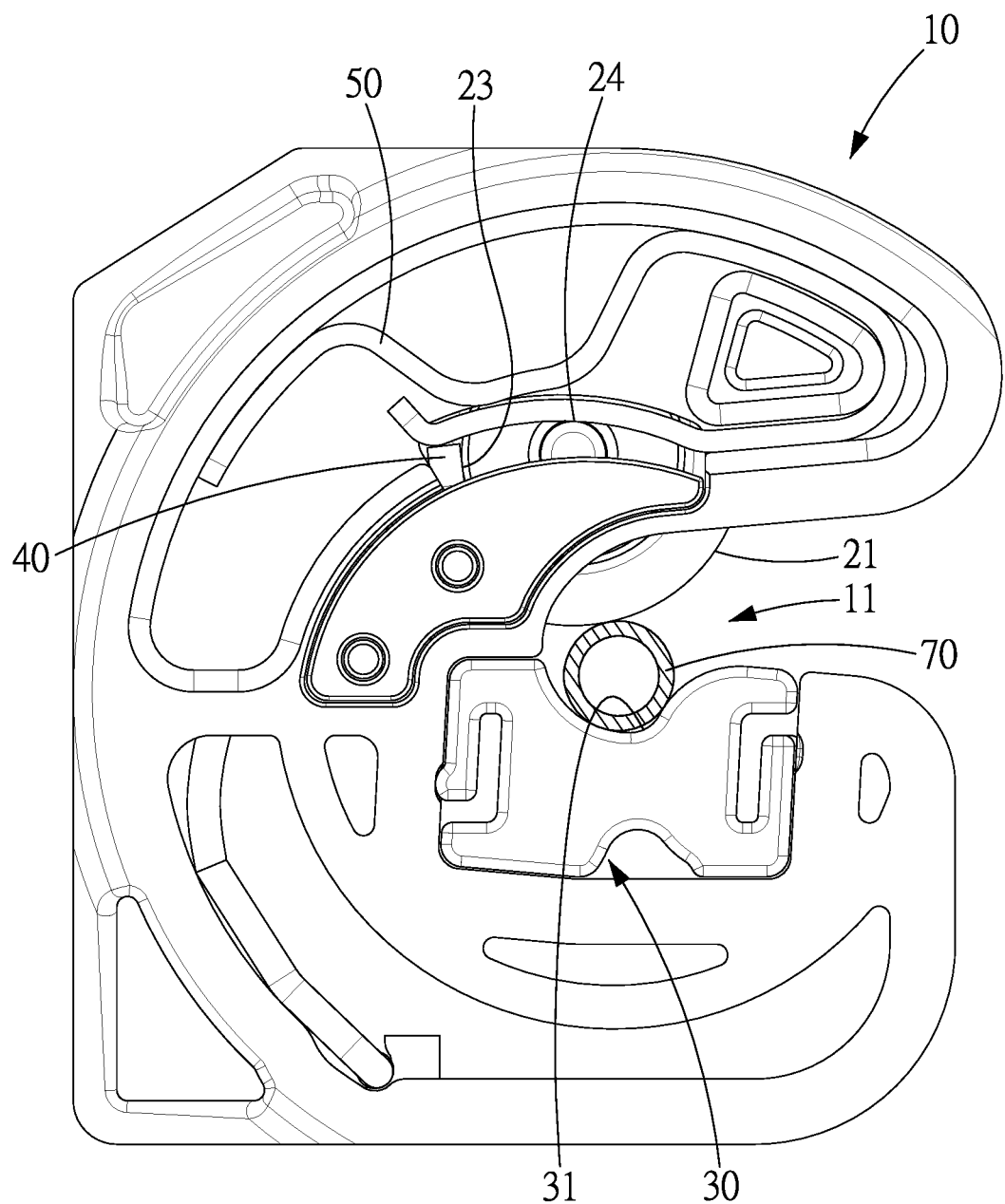
FIG. 5 is a schematic view of the preferred embodiment of the present invention, showing the tube cutting operation in the first angle.

The base 30 of the preferred embodiment of the present invention is able to be switched to different angles by a subject to receive tubes of various diameters. For example, the subject may switch the base 30 to the first angle and insert the base 30 into the groove 120 from the side openings 121 until the fixing portions 36 of the base 30 are engaged with the first limiting portion 124 and the second limiting portion 125, as shown in FIG. 5. In the present preferred embodiment, the first angle is regard as 0 degree. In this situation, the first clamping portion 31 is communicated with the cutting space 11 and corresponded to the cutting blade 21. Thereby a tube 70 of a first predetermined diameter is able to be inserted into the cutting space 11 and clamped by the first clamping portion 31 and the cutting blade 21 for cutting operation.

To switch the base 30 from the first angle to the second angle, the subject presses the arms 35 inward to release the fixing portions 36 from a fixing state, and detaches the base 30 from the groove 120. After that, the subject may switch the base 30 into the second angle and insert the base 30 into the groove 120 as the same way mentioned above.

Figure 6:
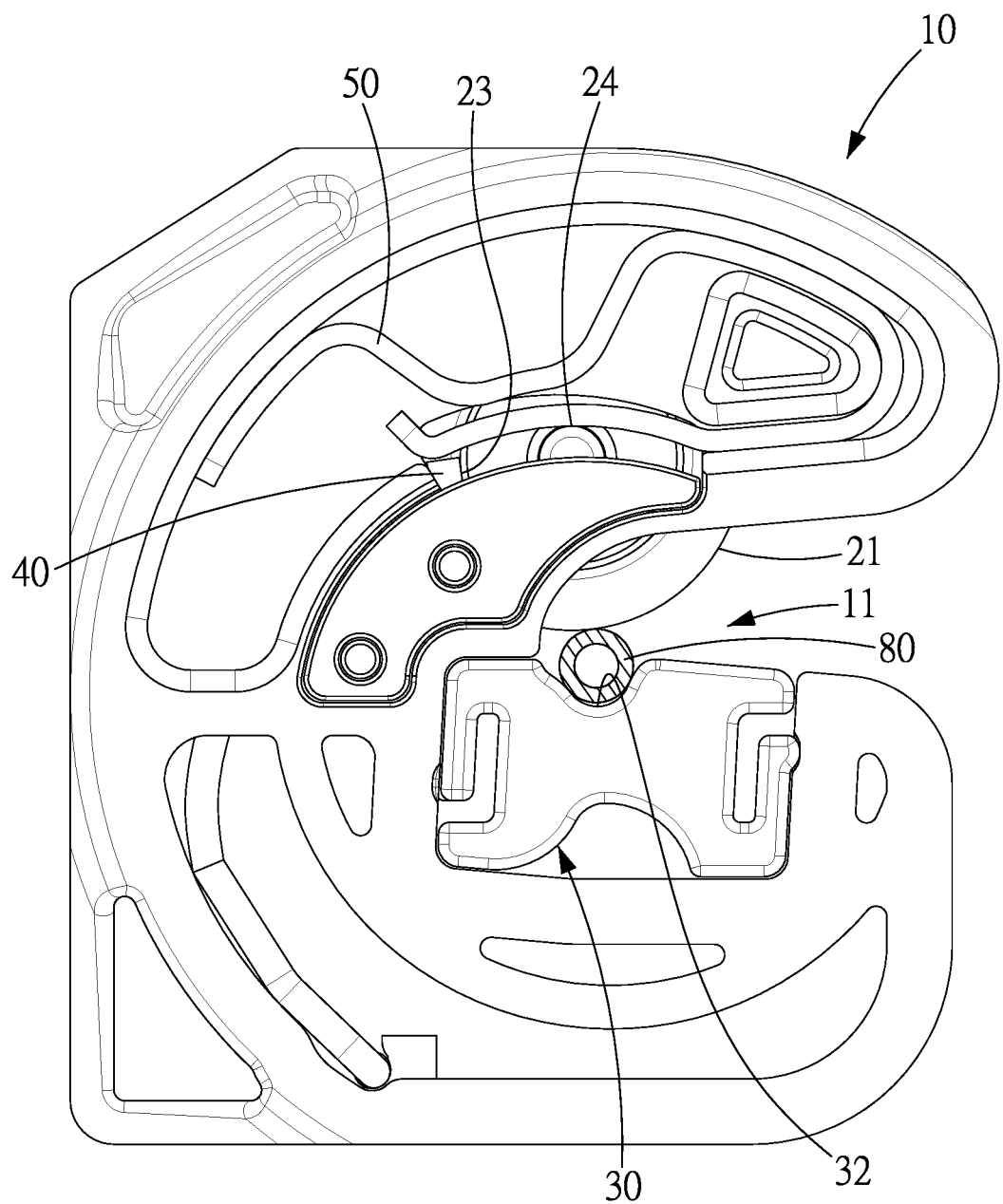
FIG. 6 is a schematic view of the preferred embodiment of the present invention, showing the tube cutting operation in the second angle.

As shown in FIG. 6, the base 30 is received in the main body 10 in the second angle. In the present preferred embodiment, the second angle is regard as 180 degree. In this situation, the second clamping portion 32 is communicated with the cutting space 11 and corresponded to the cutting blade 21. Thereby a tube 80 of a second predetermined diameter is able to be inserted into the cutting space 11 and clamped by the second clamping portion 32 and the cutting blade 21 for cutting operation. Due to the widths and the depths of the first clamping portion 31 and the second clamping portion 32 are different, the tube cutter of the preferred embodiment of the present invention is able to cut tubes with different diameters by switching the base 30. In the present preferred embodiment, the first angle is 0 degree and the second angle is 180 degree. In an alternative preferred embodiment, the first angle and the second angle can be any different angle.

In the present preferred embodiment, the base 30 is switched between the first angle and the second angle by detaching the base 30 from the main body 10. In an alternative preferred embodiment, the base is switched between the first angle and the second angle without being detached from the main body. For example, the base is pivoted on the main body to be driven to rotate to the first angle or the second angle.

On the other hand, whether a tube is clamped at the first angle or the second angle, the tube would push the cutting blade 21 inward, making the first elastic member 40, the second elastic member 50 and the third elastic member 60 being compressed to provide preloads in multiple directions on the cutting member 20. Thus, the cutting member 20 provides a multi-directional automatic feeding effect under the elastic forces during any tube cutting operation.

In conclusion, the tube cutter of the preferred embodiment achieves the ability to cut tubes with various diameters by employing various installation methods of the base 30. Compared to prior tube cutter that can only cut tubes of specific diameter, the present invention allows cutting operations of tubes in different diameters without changing other tube cutters, thereby provides a convenient tube cutting experience.

It must be pointed out that the embodiments described above are only some preferred embodiments of the present invention. All equivalent structures which employ the concepts disclosed in this specification and the appended claims should fall within the scope of the present invention.

What is claimed is:

1. A tube cutter, comprising:
a main body having a cutting space and a mounting portion corresponded to the cutting space;
a cutting member received in the main body and having a least a portion protruding into the cutting space; and
a base having a first clamping portion and a second clamping portion; wherein the base is received in the mounting portion of the main body to be switched between a first angle and a second angle; the first clamping portion is communicated with the cutting space to clamp a tube of a first predetermined diameter when the base is switched to the first angle, and the second clamping portion is communicated with the cutting space to clamp a tube of a second predetermined diameter when the base is switched to the second angle.

2. The tube cutter of claim 1, wherein the base is detachably connected to the main body to be switched between the first angle and the second angle by detaching the base from the main body.

3. The tube cutter of claim 1, wherein the mounting portion is provided with a groove, in which the base is received; the groove has a top opening and a side opening; the top opening is communicated with the cutting space, allowing the first clamping portion or the second clamping portion to communicate with the cutting space; the side opening isn't communicated with the cutting space, allowing the base for insertion into or removal from the groove.

4. The tube cutter of claim 3, wherein the mounting portion further comprises a blocking surface covering at least a portion of the top opening, so that a width of the top opening is smaller than that of the base.

5. The tube cutter of claim 4, wherein the base further comprises a first interface connected to the first clamping portion and a second interface connected to the second clamping portion; the first interface is engaged with the blocking surface when the base is switched to the first angle, and the second interface is engaged with the blocking surface when the base is switched to the second angle.

6. The tube cutter of claim 1, wherein the mounting portion has a first limiting portion and a second limiting portion; the base has a fixing portion; the fixing portion is engaged with the first limiting portion when the base is switched to the first angle, and the fixing portion is engaged with the second limiting portion when the base is switched to the second angle.

7. The tube cutter of claim 6, wherein the mounting portion has a groove; the first limiting portion and the second limiting portion are formed on sidewalls of the groove respectively, and the first limiting portion is higher than that of the second limiting portion.

8. The tube cutter of claim 6, wherein the base has an arm, on which the fixing portion is provided.

9. The tube cutter of claim 1, wherein the base has two arms on opposite sides thereof, each of the arms is provided with a fixing portion; the mounting portion of the main body has two first limiting portions and two second limiting portions; the fixing portions are engaged with one of the first limiting portions and one of the second limiting portions respectively when the base is switched to the first angle, and the fixing portions are engaged with the other first limiting portion and the other second limiting portion respectively when the base is switched to the second angle; each of the arms has a connecting end and a free end, the connecting ends of the arms are connected to the base, while the free ends of the arms extend in opposite directions.

10. The tube cutter of claim 1, wherein the first clamping portion and the second clamping portion are two slots formed on opposite sides of the base respectively.

* * * * *